United States Patent [19]

Suzuki

[11] 4,212,532
[45] Jul. 15, 1980

[54] SLIT EXPOSURE TYPE COPYING APPARATUS

[75] Inventor: Hidenori Suzuki, Kawasaki, Japan

[73] Assignee: Minolta Camera Kabushiki Kaisha, Osaka, Japan

[21] Appl. No.: 941,640

[22] Filed: Sep. 12, 1978

[30] Foreign Application Priority Data

Sep. 20, 1977 [JP] Japan .................... 52-127226[U]

[51] Int. Cl.² .................................................. G03B 27/70
[52] U.S. Cl. ......................................... 355/60; 355/8
[58] Field of Search .............................. 355/8, 55–63, 355/47–51, 11, 65, 66

[56] References Cited

U.S. PATENT DOCUMENTS

| | | | |
|---|---|---|---|
| 3,884,574 | 5/1975 | Dol et al. | 355/8 X |
| 4,118,118 | 10/1978 | Barto | 355/8 |
| 4,125,323 | 11/1978 | Ikeda et al. | 355/8 |
| 4,126,389 | 11/1978 | Ikeda et al. | 355/8 X |
| 4,135,812 | 1/1979 | Kingsland | 355/8 X |

*Primary Examiner*—R. L. Moses
*Attorney, Agent, or Firm*—Wenderoth, Lind & Ponack

[57] ABSTRACT

A slit exposure type copying apparatus capable of producing copies at various magnifications has a holder for holding an original to be copied in a stationary position at one end of an optical path, a photosensitive member at the other end of the optical path, an exposure slit through which portions of an image of the original are successively projected, the photosensitive member being movable past the exposure slit at a speed V, and a mirror structure having a first and second reflecting surfaces disposed perpendicular to each other, the second reflecting surface reflecting the successive portions of the image to the exposure slit and onto the photosensitive member through said slit. A replaceable stationary projection or a zoom lens is disposed between the holder for the original and the first reflecting surface, and the mirror structure is movable to scan the successive parts of the image of the original projected by the projection lens in a direction and having a velocity which has a velocity component V/2 perpendicular to the optical axis of the image striking the first reflecting surface and leaving the second reflecting surface, whereby the image can be projected at different magnifications without changing the speeds of movement of the photosensitive member and said first and second surfaces.

8 Claims, 9 Drawing Figures

SLIT EXPOSURE TYPE COPYING APPARATUS

The present invention relates to a slit exposure type copying apparatus and more particularly relates to an optical scanning means for a slit exposure type copying apparatus.

BACKGROUND OF THE INVENTION

While a number of slit exposure type copying apparatuses employing various optical scanning means for scanning an original to be copied have been proposed, it is generally well known that when changing the magnification factor of the projected image, the conjugate distance must be changed or the projection lens must be replaced with another, and the speed of movement of the photosensitive member onto which an image of original is projected should be changed. Changes in the magnification factor become necessary when reproducing a set size of image from microfilm because the size of the frames vary because of differences in standards for microfilms. However, if the moving speed of photosensitive member is changed in accordance with the magnification, it becomes necessary to change the paper feeding speed, developing speed and so forth to correspond therewith, and because this is quite difficult and complicated, the more normal practice is to change the scanning speed of the optical scanning means, as shown in U.S. Pat. No. 3,614,222.

On the other hand, if the copying apparatus is the type in which the original to be copied is moved while the optical means is kept stationary, the speed of movement of the original may be changed instead of changing the speed of photosensitive member when there is a change of the magnification. However, if the original has an extremely small size, such as microfilm, the magnifying factor when enlarging is to be achieved is quite large, and the speed of movement of the microfilm is comparatively slow relative to the speed of the photosensitive member. Thus, in a case such as this, it is difficult to establish the proper relative speeds between the photosensetive member and microfilm if the magnification is to be changed.

To explain this in greater detail, reference is made to FIG. 1, in which a photosensitive member 1 in the form of a drum is rotated in the direction of the arrow at a velocity of V and the image of microfilm 3 is magnified by a projection lens 4 and projected through a slit 2 onto the photosensitive member 1 for forming an electrostatic latent image thereon. If the magnifying power of the lens 4 is to be M, then the microfilm may be moved at a speed of V/M in the direction opposite to the direction of rotation of the photosensitive member 1. However, since the magnification M of the microfilm 3 is large, such as on the order of 22, and if another projection lens 4' with a high magnifying power, such as on the order of 26, is substituted for the lens 4 to effect a change in magnification, the speed of movement of the microfilm 3 must be changed from 1/22 to 1/26 of the circumferential speed of the photosensitive member. Because this change of speed is normally effected by a reduction gear or by other suitable means, the speed of movement of film 3 tends to become inconsistent, thereby making the synchronization between the movement of the film 3 and that of the photosensitive member 1 difficult.

Thus, in order to change the magnification factor from M to M' to obtain a certain size of image, the lens 4 must be replaced with another lens 4' having a different focal length and also the speed of movement of the film 3 must be changed to V/M'. However, if V/M and V/M' are compared, the difference is quite small, and it is technically complicated to change the moving speed of film by a change in the power supplied to a driving motor. Similarly, to change the speed of movement of the film by gear means require separate sets of gears corresponding to each speed of movement, thereby making the system mechanically complicated.

As one solution to this problem, there has been proposed, in Japanese Published Examined Utility Model Application SHO No. 45-6456 published on Mar. 31, 1970, a copying apparatus as shown schematically in FIG. 2, in which a right angled mirror 6 is moved at one half the circumferential speed V of the photosensitive drum 7 for a distance l/2 which is half the length l of a stationary original 5. In this manner, the image of original is scanned and projected onto the drum 7 through the projection lens 4.

The arrangement shown in FIG. 2 operates basically on the same principle as the arrangement of FIG. 3 in which the original 5 to be copied is moved at a speed of v for a distance of l while the photosensitive drum 7 is moved at the circumferential speed of V. The relationship between the moving speed v of the original 5 and the circumferential speed V of the photosensitive drum 7 is V=Mv wherein M is the magnification power of lens 4. Accordingly, it is necessary to change either the moving speed v of original 5 or the circumferential speed V of photosensitive drum 7 to effect copying at another magnification. Thus, this system similarly requires a change of speed in accordance with the desired magnification, and it is technically difficult to establish the required speed the same as in other prior art devices.

SUMMARY OF THE INVENTION

It is accordingly a primary object of the present invention to provide a novel optical scanning means for a slit exposure type copying apparatus which is free from the above described drawbacks.

It is another object of the present invention to provide an improved optical scanning means for a slit exposure type copying apparatus shich is capable of projecting an image of a microfilm at various magnifications.

It is still another object of the present invention to provide an optical scanning means for a slit exposure type copying apparatus or the like which is capable of producing copies at various magnification without any change of speed.

These and other objects of the present invention are achieved by providing a right angled mirror which moves in such a way as to scan at velocity of V/2 in a direction the same as the direction of movement of the photosensitive member moving at velocity of V, and a projection lens is positioned in the optical path between the original to be copied and the right angled mirror. A change of magnification is effected by replacing the projection lens with another or by utilizing a zoom lens the magnification factor of which can be changed.

For a fuller understanding of the nature and objects of the present invention, reference is made to the following detailed description taken in conjunction with the accompanying drawings.

DESCRIPTION OF PREFERRED EMBODIMENTS

Figure 4:
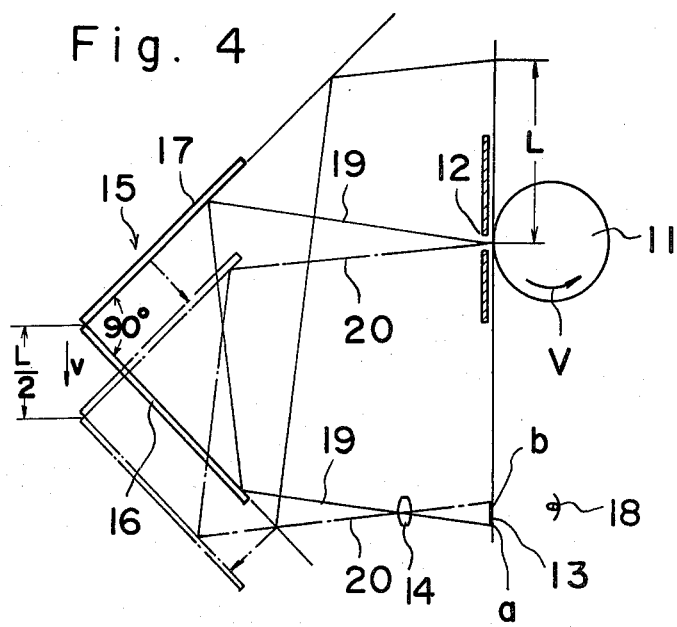
FIGS. 4 and 5 are schematic views illustrating the principal of the optical scanning means for a slit exposure type copying apparatus or the like in accordance with the present invention.

Referring to FIG. 4, the numeral 11 designates a photosensitive member in the form of a drum which is rotatable in the direction of the arrow at a circumferential speed of V; a plate with an exposure slit 12 is provided adjacent the photosensitive member 11 and through which an image of an original is projected; the original to be copied is in the form of microfilm 13 and is held stationary; a projection lens 14 for projecting the image is fixed along the optical axis 21 (see FIG. 5) from the position of the original to the drum; a right angled mirror means comprising a mirror member 15 including first and second reflecting mirrors 16 and 17 is positioned to reflect the image from the lens 14 to the slit 12 and is driven by a drive means D; and a light source 18 is provided for illuminating the original. It is to be noted that first and second reflecting mirrors 16 and 17 of right angled mirror member 15 are disposed perpendicular to one another with each mirror inclined at an angle of 45° relative to the optical axis 21. In this embodiment, these two reflecting mirrors 16 and 17 are connected in an integral body and are moved by the drive means D in the direction of the arrow at a speed of v as will be further explained hereinafter. Although now shown, the system shown in FIG. 4 includes a conventional charging means, developing means, image transferring means, cleaning means and residual charge erasing means around the periphery of photosensitive member 11 so that a final image will be formed on copying paper contacted with the drum and the photosensitive member can be used again for obtaining another copy.

If the initial or scan starting position of right angled mirror member 15 is the position shown by solid lines as seen in FIG. 4 and if the image in a frame of microfilm 13 having a length from a to b is to be scanned and projected onto the photosensitive member 11, the image portion at edge a of the microfilm frame is magnified and projected to the exposure slit 12 along the optical path 19. Specically, the image from the edge portion a of frame of microfilm 13 is illuminated by light source 18 and projected through the projection lens 14 and magnified. It is then reflcted by reflecting mirrors 16 and 17 and projected onto the photosensitive member 11 through the exposure slit 12 along the optical path 19. As the right angled mirror member 15 moves parallel to the microfilm 13 and parallel to an image receiving surface of photosensitive member 11, the portions of the image of microfilm 13 are successively projected, and when the mirror member reaches the position shown by the single dot chain lines, the scan of the image is completed and the image portion at end edge b is projected along the optical path 20 indicated by the single dot chain line.

Figure 2:
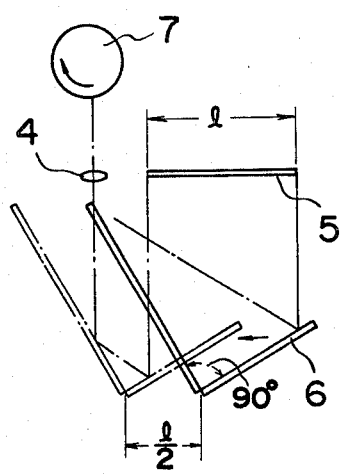
FIG. 2 is a schematic view of a prior art optical scanning means.
Figure 3:
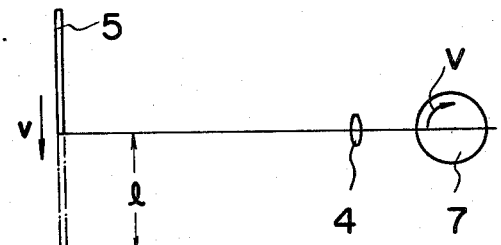
FIG. 3 is a schematic view of a system which is the equivalent to the scanning means shown in FIG. 2.

If the effective length of the image to be projected is assumed to be L, then the right angled mirror member 15 needs only to be moved a distance L/2 as is the case with FIG. 2. This shows that by setting the spped v of travel of right angled mirror member 15 to half the peripheral speed V of the photosensitive member, i.e., by setting the speed of right angled mirror member 15 to ½ V, the entire image will be projected successively onto the photosensitive member 11. In other words, as can be understood from FIG. 5, the movement of the right angled mirror member 15 a distance of L/2 at a speed of V/2 is equivalent to the movement of all of the projected optical paths of the image by the projecting lens 14a a distance of L at a speed of v (i.e., V/2) as illustrated by solid lines 30 and 31 and by single dot chain lines 30' and 31'.

It therefore follows that the relation between the peripheral speed V of the photosensitive member 11 and the speed V/2 of travel of the right angled mirror member 15 is constant irrespective of the magnification by the lens 14 and that the magnification by the lens can be varied as desired while the speed of the right angled mirror member 15 remains unchanged. This means that various magnifications of the image can be achieved by merely replacing the projecting lens 14 with another having the desired magnifying power or by utilizing a zoom lens, and the speeds of the right angled mirror member 15 and the photosensitive member 11 need not be changed.

Figure 1:
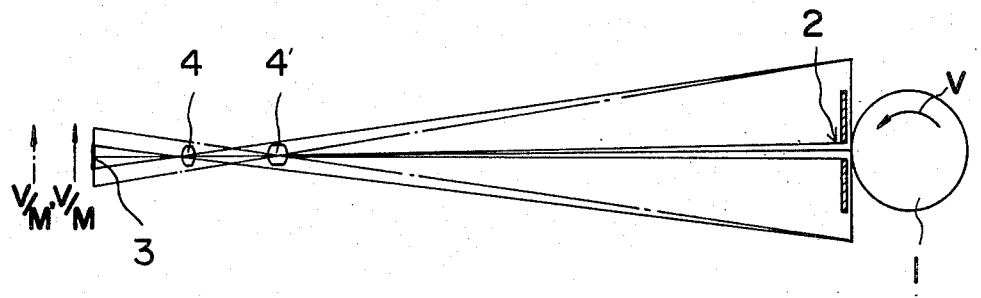
FIG. 1 is a schematic view of conventional image projecting means for a slit exposure type copying apparatus.
Figure 5:
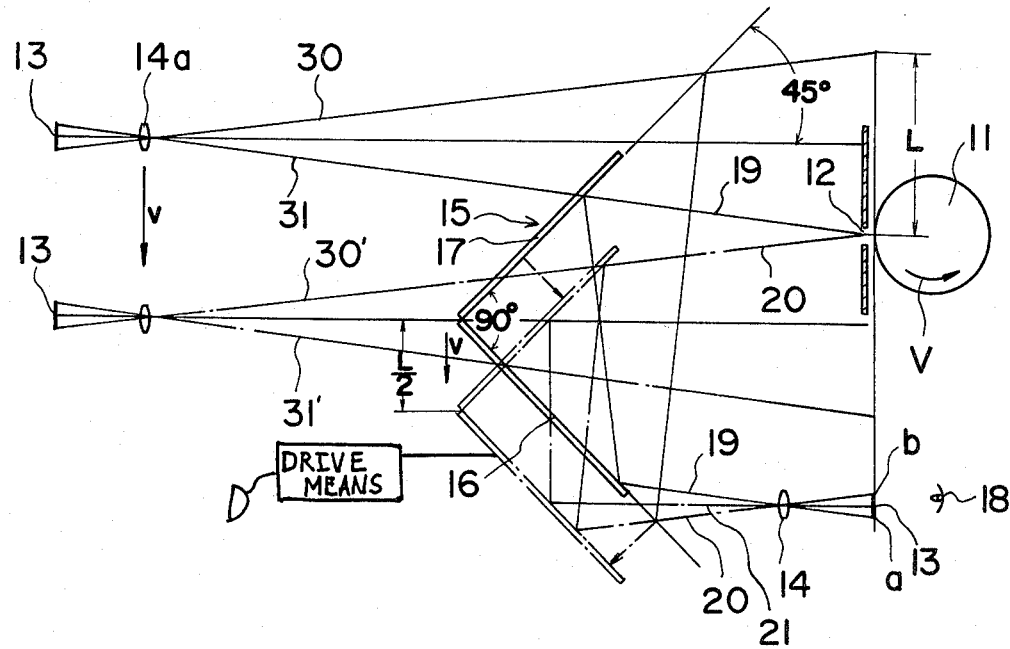
Figure 6:
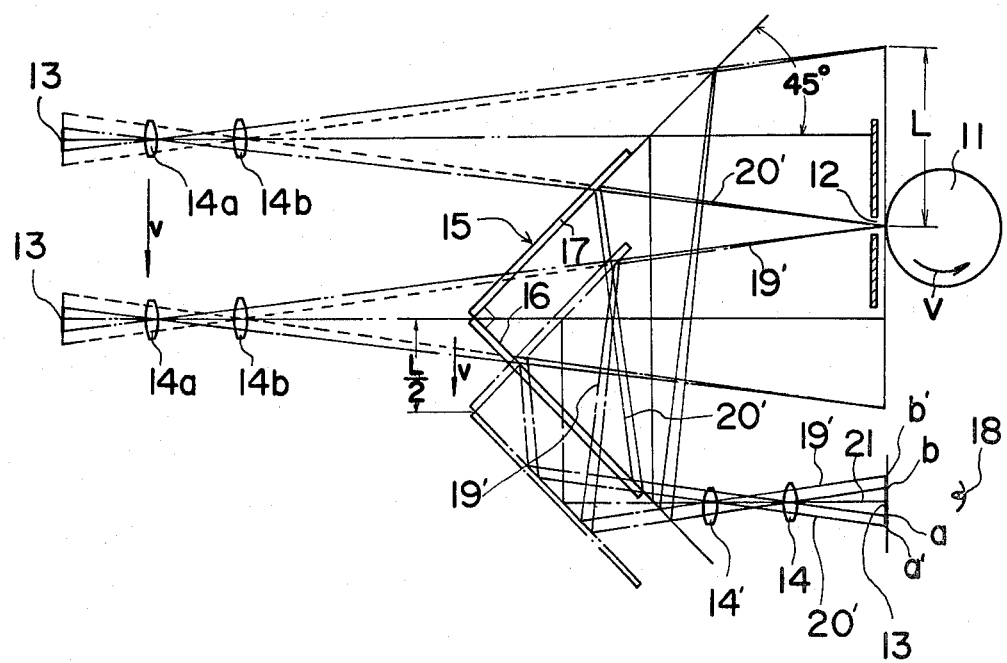
FIGS. 6 and 7 are schematic views showing optical scanning means of the present invention capable of projecting an image at various magnification.

FIG. 6 shows how the optical scanning means projects an image of an original at another magnification. Specifically, this figure shows a case in which a microfilm 13 having larger frame size and having an image length of a' to b' is projected to produce an image size the same as the image size of the image produced from the microfilm having the smaller length of a to b. To do this, it merely requires the replacement of projection lens 14 of FIGS. 4 and 5 with another lens 14' having a longer focal length. With the lens 14' placed on the optical axis 21, the right angled mirror member 15 including reflecting mirrors 16 and 17 travels from the solid line position to the single dot chain line position over a distance of L/2 at a speed of v or V/2 so that the microfilm 13 is successively scanned and the portions projected along the optical paths from 19' to 20'. This is equivalent to the movement of all optical paths through lens 14a or 14b for the distance of L at a speed of V/M or V/M' as in the case of FIG. 1. However, no change in speed of optical means is required in accordance with the present invention as compared with any of the above described prior art optical scanning means.

If a larger image is to be projected from a frame of microfilm of same size or from a frame of smaller size than the microfilm 13 having a length of a to b, then the projection lens 14 should be replaced with the one having a shorter focal length and placed on the optical axis closer to the microfilm 13. Needless to say, a suitable zoom lens may be used instead.

Figure 7:
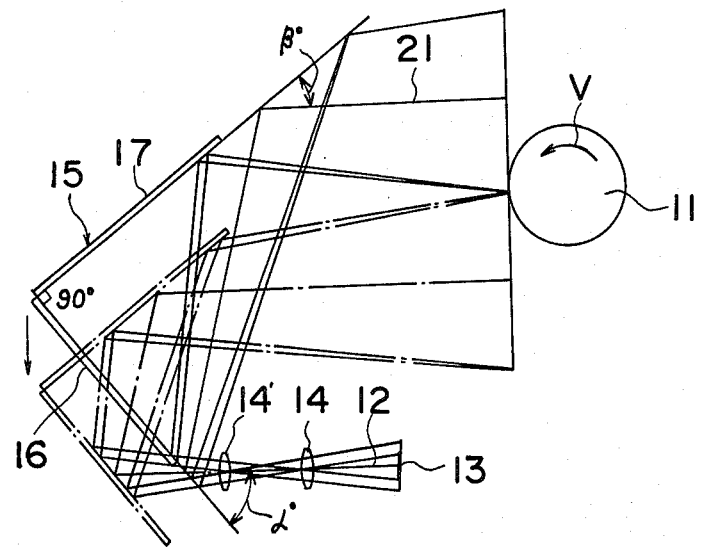

While the embodiment shown in FIGS. 4 through 6 has the first and second reflecting mirrors 16 and 17 of right angled mirror member 15 inclined at an angle of 45° relative to the optical axis 21, first reflecting mirror 16 may be inclined at an angle of α other than 45° relative to the optical axis 21 and the second reflecting mirror 17 at angle of β which is the complement of angle α i.e. α subtracted from 90° (i.e., β°=90°−α°) as shown in FIG. 7. However, it is best to make the angles α and β 45° since this makes it possible to use less space for the system.

Also the right angled mirror member 15 need not necessarily be moved perpendicular to the optical axis 21 as in the embodiment of FIGS. 4–6, but may be moved in a direction perpendicular to the first reflecting surface 16 at speed of $V/2\sqrt{2}$. That is to say, the direction of travel of right angled mirror member 15 may be in any direction as long as it has a velocity component of the mirror member in the direction which is in effect parallel to microfilm 13 or to the exposed surface of photosensitive member 11 which is V/2, i.e. half the speed of the photosensitive member 11. If the successive portions of the image are not received directly through a lens from the original, or if the successive portions are not sent directly through the slit 12, but are for example reflected from one or more mirrors or the like, then it should be understood that the velocity component should be perpendicular to the optical axis of the image striking the one mirror 16 and leaving the second mirror 17.

Figure 8:
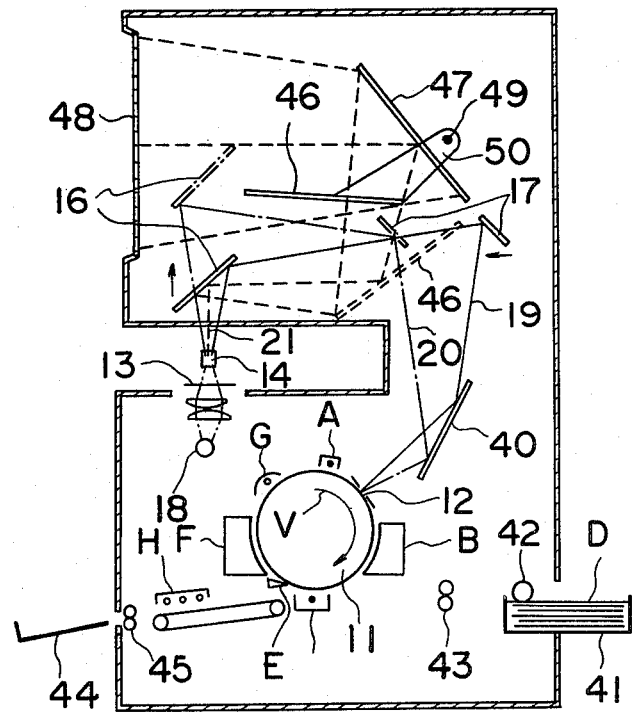
FIG. 8 is a cross sectional view of viewing and copying apparatus employing the optical scanning means of the present invention.

Referring now to FIG. 8 showing a viewing and copying apparatus employing the optical scanning means of present invention, the same numerals are used to designate like parts. In this embodiment the right angled mirror means has the mirrors 16 and 17 separately positioned but movable together. The first reflecting mirror 16 is disposed above the projection lens 14 inclined at an angle of 45° relative to the optical axis 21 whereas the second reflecting mirror 17 is disposed at position perpendicular to the first reflecting mirror 16. Both of these mirrors 16 and 17 are respectively movable at the same speed in the directions of the arrows from the solid line positions to the single dot chain line positions. Downstream of the optical paths from the mirrors 16 and 17, there is provided a fixed mirror 40 for reflecting and projecting an image scanned by the mirrors 16 and 17 onto the photosensitive member 11 through the exposure slit 12. The photosensitive member 11 is rotatable in the direction of the arrow at a speed of V, and disposed therearound are conventional charging means A for uniformly charging the member 11, developing means B for developing an electrostatic latent image, image transferring means C for transferring the image onto copying paper D, separating means E for separating paper, cleaning means F for cleaning residual toner and erasing means G for erasing residual charges. The copying paper D is fed from a paper casette 41 by feeding roller 42 and through the rollers 43. After the image is transferred, the paper D is passed through fixing means H and discharged into tray 44 by discharge rollers 45.

Figure 9:
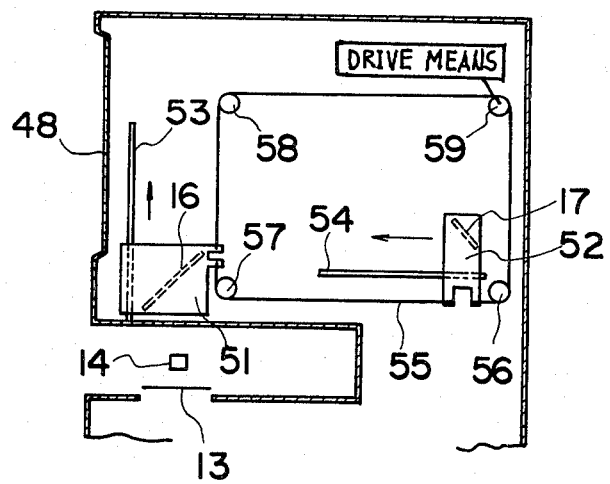
FIG. 9 is a cross sectional view of driving means for the optical scanning means of the present invention as shown in FIG. 8.

Also provided in the upper half of the apparatus are first and second projecting mirrors 46 and 47 for projecting the image onto screen 48 for viewing pruposes. The first projecting mirror 46 is movable about an axis 49 between the solid line and dotted line positions by shifting a lever 50, for example, by hand. If an image on a frame of microfilm 13 is to be projected onto the screen 48, the first projecting mirror 46 is shifted to the position shown by dotted lines. In this manner, the image is reflected from first reflecting mirror 16 and first and second projecting mirrors 46 and 47 and projected onto the screen 48. On the other hand, if the image is to be projected onto the photosensitive member 11 for obtaining a copy of the same, the mirror 46 is left in the full line position and the first and second reflecting mirrors 16 and 17 are respectively moved at a speed of V/2 which is half the speed of the photosensitive member 11. FIG. 9 shows driving means for producing this motion in which each of the mirrors 16 and 17 are housed in casings 51 and 52 respectively and the casings are movably supported on respective guide rails 53 and 54. Each of the casings 51 and 52 is connected to a driving belt 55 movable around pulleys 56, 57, 58 and 59. By driving the belt, for example by driving one or more of the pulleys by a drive means D, each of mirrors 16 and 17 is moved at the same speed in directions perpendicular to one another. It should be noted that these movements of the mirrors 16 and 17 are the same as if a right angled mirror member with mirrors 16 and 17 integrally connected to each other were moved perpendicular to the optical axis of lens 14.

Thus, for obtaining a copy, the first projecting mirror 46 is retracted to the position shown by solid lines and a suitable and conventional print switch (not shown) is activated, the photosensitive member 11 rotates at a speed of V while being uniformly charged by charging means A as in a conventional copying apparatus. Simultaneously, the lamp 18 is energized and the first and second reflecting mirrors 16 and 17 are moved at speed of V/2 in the directions shown by the arrows. By this means, the portions of microfilm 13 are successively projected onto the photosensitive member 11 through the exposure slit 12 along the optical paths 19 to 20. The latent image thus formed is developed by developing means B and then transferred onto paper D by image transferring means C in the conventional manner. Thereafter, the paper is passed through fixing means H and discharged into the tray 44.

Having described the invention in connection with specific embodiments thereof, it is to be understood that further modifications may now suggest themselves to those skilled in the art and such modifications are intended to be included within the scope of the appended claims.

What is claimed is:

1. In a slit exposure type copying apparatus for obtaining copies at various magnifications of originals held in a first fixed position, the combination comprising a photosensitive member movable at a speed V past a further fixed position, means for projecting successive parts of an image of an original onto said photosensitive member and including a stationary projection lens means for projecting an image of an original at one of a plurality of magnifications during one operation of the apparatus with said photosensitive member moving at speed V and being changable for projecting an image of an original at a different magnification during another operation of the apparatus with said photosensitive member moving at speed V and a mirror means having first and second reflecting means disposed perpendicular to one another, and means for moving said mirror means to scan the successive parts of the image of the original projected by said projection lens means in a direction and having a velocity which has a velocity component V/2 perpendicular to the portions of said optical axis on which the image strikes the first reflecting means and leaves the second reflecting means.

2. In a slit exposure type copying apparatus capable of producing copies at various magnifications, the combination of means for holding an original to be copied in a stationary position at one end of an optical path, a photosensitive member at the other end of the optical path, an exposure slit means through which portions of an image of the original are successively projected, photosensitive member driving means for moving said photosensitive member past said exposure slit means at a speed V, a mirror means having a first and second reflecting means disposed perpendicular to each other, said second reflecting means reflecting the successive portions of the image to said exposure slit means and onto said photosensitive member through said slit means, a replaceable stationary projection lens disposed between the means for holding the original and said first reflecting means, and moving means for moving said mirror means to scan the successive parts of the image of the original projected by said projection lens in a direction and having a velocity which has a velocity component V/2 perpendicular to the optical axis of the image striking the first reflecting means and leaving the second reflecting means, whereby the image can be projected at different magnifications by substituting projection lenses of different focal lengths yet without changing the speeds of movement of said photosensitive member and said first and second reflecting means.

3. In a slit exposure type copying apparatus capable of producing copies at various magnifications, the combination of means for holding an original to be copied in a stationary position at one end of an optical path, a photosensitive member at the other end of the optical path, an exposure slit means through which portions of an image of the original are successively projected, photosensitive member driving means for moving said photosensitive member past said exposure slit means at a speed V, a mirror means having a first and second reflecting means disposed perpendicular to each other, said second reflecting means reflecting the successive portions of the image to said exposure slit means and onto said photosensitive member through said slit means, a stationary zoom projection lens disposed between the means for holding the original and said first reflecting means, and moving means for moving said mirror means to scan the successive parts of the image of the original projected by said projection lens in a direction and having a velocity which has a velocity component V/2 perpendicular to the optical axis of the image striking the first reflecting means and leaving the second reflecting means, whereby the image can be projected at different magnifications without changing the speeds of movement of said photosensitive member and said first and second reflecting means.

4. The combination as claimed in claim 2 or 3 wherein said moving means comprises means for moving said first and second reflecting means in a direction perpendicular to the optical axis of the image received from the projection lens.

5. The combination as claimed in claim 2 or 3 wherein said first and second reflecting means are integrally connected and said moving means comprises means for moving said first and second reflecting means in a direction perpendicular to the optical axis of the image received from said projection lens.

6. The combination as claimed in claim 2 or 3 wherein said first reflecting means is at an angle of 45° to the optical axis of the image received from said projection lens.

7. The combination as claimed in claim 2 or 3 wherein said first reflecting means is at an angle to the optical axis of the image received from the projection means which is other than 45° and the second reflecting means is at an angle to the optical axis of the image leaving the second reflecting means which is the complement of the angle of the first reflecting means to the optical axis of the image received from the projection means.

8. The combination as claimed in claim 2 or 3 wherein said first and second reflecting means are separate and said moving means comprises means for moving said first reflecting means along the optical axis of the image from the projection lens at a velocity V/2 and in a direction away from the projection lens and for moving said second reflecting means simultaneously with said first reflecting means in a direction perpendicular to the direction of movement of said first reflecting means at a velocity V/2 and in a direction toward the axis of movement of said first reflecting means.

* * * * *